(12) United States Patent
Clausen et al.

(10) Patent No.: US 8,780,687 B2
(45) Date of Patent: Jul. 15, 2014

(54) METHOD AND APPARATUS FOR VECTORED DATA COMMUNICATION

(75) Inventors: Axel Clausen, Munich (DE); Vladimir Oksman, Morganville, NJ (US); Heinrich Schenk, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 233 days.

(21) Appl. No.: 13/384,829

(22) PCT Filed: Jul. 20, 2010

(86) PCT No.: PCT/EP2010/004400
§ 371 (c)(1),
(2), (4) Date: Mar. 6, 2012

(87) PCT Pub. No.: WO2011/009584
PCT Pub. Date: Jan. 27, 2011

(65) Prior Publication Data
US 2012/0163491 A1    Jun. 28, 2012

Related U.S. Application Data

(60) Provisional application No. 61/226,789, filed on Jul. 20, 2009.

(51) Int. Cl.
| | | |
|---|---|---|
| H04B 7/185 | (2006.01) | |
| H04W 4/00 | (2009.01) | |
| H04B 3/32 | (2006.01) | |
| H04L 1/00 | (2006.01) | |
| H04B 7/24 | (2006.01) | |
| H04B 17/00 | (2006.01) | |
| H04B 17/02 | (2006.01) | |
| H04B 1/06 | (2006.01) | |
| H04B 15/00 | (2006.01) | |
| H04B 1/10 | (2006.01) | |
| H04W 28/04 | (2009.01) | |

(52) U.S. Cl.
CPC .............. *H04B 1/10* (2013.01); *H04W 28/04* (2013.01); *H04B 1/1027* (2013.01); *H04L 1/0026* (2013.01)
USPC ........... 370/201; 370/317; 370/328; 370/333; 375/220; 375/346; 455/39; 455/67.13; 455/135; 455/277.2; 455/501

(58) Field of Classification Search
CPC ......... H04B 1/12; H04B 1/126; H04B 1/123; H04B 1/1036; H04B 1/1027; H04B 3/32; H04B 3/462; H04B 3/464; H04B 7/18567; H04B 7/082; H04B 7/0802; H04B 7/0814; H04B 7/0857; H04B 7/0808; H04B 7/0811; H04B 7/0831; H04B 7/0848; H04B 15/00; H04B 17/0057; H04L 1/08; H04L 1/0009; H04L 1/0026; H04L 1/0002; H04L 1/0003; H04L 1/20; H04L 1/205; H04L 1/206; H04L 27/2614; H04L 27/2647; H04L 29/06; H04J 1/12; H04J 3/10; H01Q 3/24; H01Q 3/26; H01Q 11/04; H04W 80/04; H04W 88/06; H04W 88/08; H04W 84/18; H04W 28/04; H04W 28/22; H04W 52/12; H04W 52/24; H04W 16/14; H04W 24/00; H04W 72/082; G06K 7/0008; H04N 21/4143
USPC ......... 370/201, 278, 282, 286, 289–292, 317, 370/328, 333; 375/218–220, 222, 257, 375/259–261, 346, 356, 227; 379/406.01, 379/406.05, 406.08, 406.09, 406.1, 379/406.12–406.14, 399.01, 414, 417; 455/63.1, 14–17, 24, 69, 88, 39, 67.13, 455/135, 277.2, 278.1, 501
See application file for complete search history.

(56) References Cited
U.S. PATENT DOCUMENTS

| | | | |
|---|---|---|---|
| 2001/0006510 A1* | 7/2001 | Nordstrom et al. | 370/286 |
| 2004/0086064 A1* | 5/2004 | Van Acker et al. | 375/346 |
| 2005/0195925 A1* | 9/2005 | Traber | 375/343 |
| 2006/0029147 A1 | 2/2006 | Tsatsanis | |
| 2006/0274893 A1* | 12/2006 | Cioffi et al. | 379/399.01 |
| 2007/0127355 A1* | 6/2007 | Li et al. | 370/201 |

| | | |
|---|---|---|
| 2008/0310520 A1 | 12/2008 | Schenk |
| 2009/0116582 A1* | 5/2009 | Ashikhmin et al. .......... 375/296 |
| 2009/0175156 A1* | 7/2009 | Xu ................................ 370/201 |
| 2009/0271550 A1 | 10/2009 | Clausen et al. |
| 2010/0232486 A1* | 9/2010 | Starr et al. ................... 375/222 |

* cited by examiner

*Primary Examiner* — Alpus H Hsu
*Assistant Examiner* — Dharmesh Patel (74) *Attorney, Agent, or Firm* — Murphy, Bilak & Homiller, PLLC (57) ABSTRACT

In an embodiment, vector training signals are received. Noise affecting the training signals is evaluated, and a noise indication is thus determined.

24 Claims, 4 Drawing Sheets

METHOD AND APPARATUS FOR VECTORED DATA COMMUNICATION

So-called vectoring or vectored data transmission is a technique for coordinated transmission or reception of data from a plurality of transmitters to a plurality of receivers via a plurality of communication connections in order to improve the transmission, for example to reduce the influence of crosstalk. Either transmitters or receivers are co-located.

For example, in DSL (digital subscriber line) transmission systems, for example VDSL (very high bit rate DSL) transmission systems, data may be transmitted from a central office (CO) or other provider equipment to a plurality of receivers located in different locations, for example in customer premises (CPE), via a plurality of communication lines. Crosstalk resulting from signals on different lines transmitted in the same direction, also referred to as far end crosstalk (FEXT), may result in a reduced data throughput. Through vectoring, signals transmitted over the plurality of communication lines from the central office or received via the plurality of communication lines in the central office may be processed jointly in order to reduce such crosstalk, which joint processing corresponds to the above-mentioned vectoring. In this respect, the reduction of crosstalk by coordinated transmission of signals is sometimes referred to as crosstalk precompensation, whereas the reduction of crosstalk through joint processing of received signals is sometimes referred to as crosstalk cancellation. The communication connections which are processed jointly are sometimes referred to as vectored group.

Both at the initialization of communication and during communication, it may be necessary to add an additional communication connection to the vectored group, for example when an additional user of a DSL service becomes active. In such cases, a training has to be performed to determine the influence from the communication connection to be added to the vectored group to the communication connections already in the vectored group and vice versa to cancel the crosstalk.

Generally, for such a training predetermined signals are transmitted via the communication connections, and an error value calculated based on the transmitted signals and the received signals is used to adapt the vectoring. However, sources other than crosstalk may significantly alter the received signal. For example, impulse noise may influence the received signal significantly for short periods of time. Such influences may lead to error values which do not reflect the crosstalk, but are dominated by the impulse noise, and therefore to a misadaptation of the vectoring. In some cases, this may lead to increased bit error rates in the communication connections already in the vectored group and/or in the communication connections to be added to the vectored group, depending on the circumstances of the noise.

The independent claims define the invention in various aspects. The dependent claims define embodiments of the invention.

In a first aspect, the invention encompasses an apparatus, comprising a receiver configured to receive vector training signals, and control circuitry configured to evaluate noise and to transmit a noise indication. In an embodiment the vector training signals are transmitted via a communication connection. In an embodiment, the apparatus is suitable where the noise influences the signals received at the apparatus as training signals. In an embodiment, the noise indication is based on the evaluation of the noise. In an embodiment, the apparatus is configured to transmit the noise indication via the communication connection. At least one effect of the apparatus according to the invention in the first aspect is a capability to indicate a difference of received vector training signals such as vector training signals transmitted in a presence of noise from vector training signals transmitted in an absence of noise. For example, such indication enables an identification of such different received vector training signals transmitted in a presence of noise, an interpretation of any evaluation result based upon said identified vector training signals to be corrupted, and consequently a processing result based upon an error signal resultant from and/or associated with said identified vector training signals to be ignored. In particular, an embodiment can at least indicate presence of a noise that influences the training signals. An embodiment of the apparatus according to the invention in the first aspect is suitable for use where the noise comprises temporary noise.

An embodiment of the apparatus according to the invention in the first aspect is suitable where the training signals comprise synchronization symbols. In an embodiment of the apparatus according to the invention in the first aspect, the control circuitry is configured to compare a deviation of a received synchronization symbol from an expected value with an average deviation between synchronization symbols received and their respective expected values. At least one effect of this configuration of the control circuit in this embodiment is that for a given calculation power, for example residing in the control circuitry, a high degree of accuracy is attainable in the evaluation result. In another embodiment, the control circuitry is configured to evaluate a Trellis path length. At least one effect of this configuration of the control circuit in this embodiment is that for a given accuracy of the evaluation result to be attained little calculation power, for example residing in the control circuitry, is needed. In yet another embodiment, the control circuitry is configured to evaluate noise of at least one symbol received immediately adjacent to a synchronization symbol. Thus, the apparatus, in particular the control circuitry, is particularly adapted to evaluate the noise.

In an embodiment of the apparatus according to the invention in the first aspect, the noise indication is selected from the group consisting of a flag, a one bit signal and a multi-bit signal. Using a flag and/or using a one bit signal is easy to implement across a huge variety of equipment. A flag or a one bit signal allows to differentiate an error signal likely to be corrupted and thus useless or even damaging in a cross talk cancellation control process, for example due to noise, in particular due to temporary noise, from an error signal that seems to be useful in the cross talk cancellation control process.

In an embodiment of the apparatus according to the invention in the first aspect, transmitting the noise indication comprises transmitting the noise indication via a backchannel.

In an embodiment of the apparatus according to the invention in the first aspect, said receiver is configured to receive signals via a plurality of communication channels, and wherein said control circuitry is configured to transmit a plurality of noise indications for different communication channels.

In a second aspect, the invention encompasses an apparatus, comprising a plurality of transmitters to be coupled to communication connections, and a vectoring device. In an embodiment the plurality of transmitters is configured to transmit vector training signals via said communication connections. In an embodiment the vectoring device is configured to reduce the influence of crosstalk between at least some of said communication connections by vectoring. In an embodiment, the vectoring device is configured to adapt its vectoring based on error information and/or noise information received in response to said sending of said training signals. In an embodiment, said vectoring device is adapted to extend a time period allocated to said adapting if said noise indication indicates noise exceeding a predetermined threshold. In an embodiment, the vectoring device is configured to terminate said adaptation if said noise indication indicates noise exceeding a predetermined threshold. In an embodiment, the vectoring device is configured to disregard an error value associated with noise exceeding a predetermined threshold indicated by said noise indication. In an embodiment, the association does not need to be established in the apparatus. For example, the vectoring device is adapted to receive a flag indicating an associated error value to be qualitatively different from other error values thus begging a processing of error values by the vectoring device different from the processing of other error values. For example, the vectoring device can ignore flagged error values.

In an embodiment of the apparatus according to the invention in the second aspect, the vectoring device is configured to limit an error value associated with noise exceeding a predetermined threshold as indicated by said noise indication. In an embodiment, the noise indication indicates the presence of temporary noise. In an embodiment, the transmitters are configured to transmit DSL signals. In an embodiment, the transmitters are configured to transmit modulated sequences of synchronization signals as training signals, wherein sequences assigned to different communication connections are orthogonal to each other.

In a third aspect, the invention encompasses an apparatus, comprising a vectoring device configured to reduce crosstalk between communication connections by vectoring, wherein the vectoring device comprises crosstalk reduction circuitry configured to adapt said vectoring based on error information and noise information.

In a fourth aspect, the invention encompasses an apparatus, comprising a plurality of receivers to be coupled to respective communication connections, a vectoring device configured to reduce the influence of crosstalk between said communication connections by vectoring, and control circuitry configured to determine error values and noise indications based on said received training signals. In an embodiment, the receivers are configured to receive predefined training signals. In an embodiment, the vectoring device is configured to adapt the vectoring based on said calculated errors and said noise indication. In an embodiment, adapting of said vectoring comprises adding an additional communication connection to the vectoring. In an embodiment, the receivers are configured to receive DSL signals.

In a fifth aspect, the invention encompasses a method, comprising: determining error information based on received predefined training signals, and determining noise information characterizing temporary noise affecting said error information. In an embodiment, the method further comprises transmitting said error information and/or said noise information. In an embodiment, the method further comprises adapting a vectoring based on said error information and said noise information. In an embodiment, the adapting said vectoring comprises one of the group consisting of increasing a time assigned to the adapting said vectoring based on said noise information, terminating said adapting based on said noise information, disregarding an error information based on said noise information and limiting an error information based on said noise information.

In a sixth aspect, the invention encompasses a method comprising receiving error information and noise information characterizing temporary noise affecting said error information, and performing a vector training based on said error information and said noise information.

The above summary is merely intended to give a brief overview of some features of some embodiments of the present invention, and other embodiments may comprise additional and/or different features than the ones mentioned above. In particular, this summary is not construed to be limiting the scope of the present application.

BRIEF DESCRIPTION OF THE SEVERAL VIEWS OF THE DRAWINGS

A detailed description is provided below with reference to the accompanying figures of which.

DETAILED DESCRIPTION

In the following, some embodiments of the present invention will be described in detail. It is to be understood that the following description is given only for the purpose of illustration and is not to be taken in a limiting sense. The scope of the invention is not intended to be limited by the embodiments described hereinafter with reference to the accompanying drawings, but is to be intended only to be limited by the appended claims and equivalents thereof.

It is also to be understood that in the following description of embodiments any direct connection or coupling between functional blocks, devices, components, circuit elements or other physical or functional units shown in the drawings or described herein could also be implemented by an indirect connection or coupling. Furthermore, it should appreciated that functional blocks or units shown in the drawings may be implemented as separate circuits in embodiments, but may also be fully or partially implemented in a common circuit in other embodiments. For example, several functional blocks may be implemented as software running on a common processor like a signal processor. It is further to be understood that any connection which is described as being wire-based in the following specification may also be implemented as a wireless communication unless noted to the contrary.

It should be noted that the drawings are provided to give an illustration of some aspects of embodiments of the present invention and therefore are to be regarded as schematic only. In particular, the elements shown in the drawings are not necessary to scale with each other, and the placement of various elements in the drawings is chosen to provide a clear understanding of the respective embodiment and is not to be construed as necessarily being a representation of the actual relative locations of the various components in implementations according to an embodiment of the invention.

The features of the various embodiments described herein may be combined with each other unless specifically noted otherwise.

The term "communication connection" as used herein is intended to refer to any kind of communication connection including wire-based communication connections and wireless communication connections.

Figure 1:
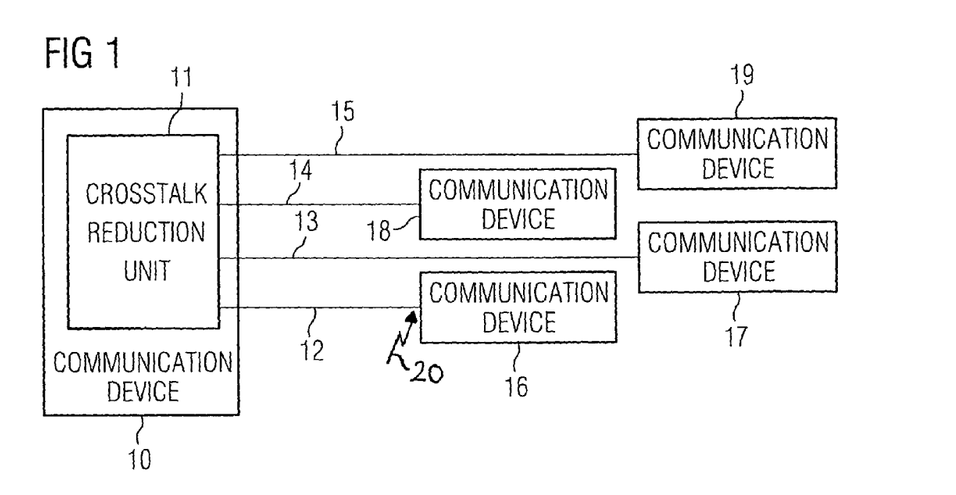
FIG. 1 shows a communication system according to an embodiment of the present invention.

In FIG. 1, a communication system according to an embodiment of the present invention is schematically shown.

In the communication system of FIG. 1, a communication device 10 communicates with communication devices 16, 17, 18 and 19 via respective communication connections 12, 13, 14 and 15. While in FIG. 1 four communication devices 16, 17, 18 and 19 are shown, in other embodiments any suitable other number of communication devices may also be provided.

In an embodiment, the communication via communication connections 12, 13, 14 and 15 is a bidirectional communication. In such an embodiment, communication device 10 may comprise a transceiver for each of the communication connections 12, 13, 14 and 15, and each communication device 16, 17, 18 and 19 also may comprise a transceiver. In another embodiment, all or some of communication connections 12, 13, 14 and 15 may be unidirectional communication connections. In another embodiment, all or some of the communication devices 16, 17, 18, 19 might be co-located.

In the embodiment of FIG. 1, couplings between the communication connections 12-15 may cause crosstalk, for example if some or all of the communication connections are wire lines running close to each other. Through at least partial joint processing of the signals transmitted from communication device 10 to communication device 16, 17, 18 and 19 and through at least partial joint processing of signals received from communication devices 16, 17, 18 and 19 at communication device 10 in a crosstalk reduction unit 11, the influence of such crosstalk may be reduced. As already mentioned, the joint processing for crosstalk reduction is also referred to as vectoring, and the communication connections which are subjected to such a crosstalk reduction are also referred to as vectored group.

In the following, the transmission direction from communication device 10 to communication devices 16, 17, 18 and 19 will be referred to as downstream direction, and the opposite transmission direction from communication devices 16, 17, 18 and 19 to communication device 10 will be referred to as upstream direction. Reduction of crosstalk in the downstream direction is also referred to as crosstalk precompensation since the signals transmitted are modified before transmission, i.e. before the actual crosstalk occurs, whereas the reduction of crosstalk in the upstream direction is also referred to as crosstalk cancellation as here through joint processing in crosstalk reduction unit 11 the crosstalk is reduced or cancelled after it has occurred.

In embodiments, crosstalk cancellation may for example be performed by calculating received signals for each communication connection depending on a linear combination of all received signals on all communication connections of the vectored group, and crosstalk precompensation may be performed by calculating signals to be transmitted via each communication connection depending on a linear combination of signals to be transmitted on all communication connections. However, other calculation methods, for example non-linear calculations, are also possible.

In order to perform this crosstalk reduction, i.e. the vectoring, the crosstalk reduction unit 11 has to be "trained", i.e. the crosstalk reduction unit 11 needs information regarding the actual crosstalk occurring between the communication connections in the vectored group. This may for example be achieved by transmitting predetermined training signals, for example pilot signals, via the communication connections and analyzing the received signals to determine the crosstalk. In embodiments, data transmission via the communication connections comprises the transmission of pilot signals or symbols, wherein between the pilot signals other data like payload data may be transmitted. In an embodiment, the pilot signals or modified pilot signals are used for training crosstalk reduction unit 11. In an embodiment, synchronization signals or synchronization symbols may be used as pilot signals.

In a communication system like the one shown in FIG. 1, the situation may occur that a communication connection is to be added to the vectored group. For example, in the embodiment of FIG. 1 initially only communication connections 12, 13 and 14 may be included in the vectored group, while communication connection 15 may be inactive (for example communication device 19 may be switched off) and therefore not be added to the vectored group. When communication device 19 becomes active, in order to also reduce the crosstalk between communication connection 15 and communication connections 12-14 which already are incorporated in the vectored group, communication connection 15 is to be added to the vectored group. For such an additional communication connection to be added, crosstalk reduction unit 11 has to be trained and adapted accordingly.

In an embodiment, for adding an additional communication connection (like communication connection 15 in the above example) to a vectored group, a first vector training is performed to reduce or cancel the crosstalk resulting from the influence of the communication connection to be added, hereinafter also referred to as the joining connection, to the communication connections already in the vectored group. When this first vector training is completed, the influence of data transmitted over the joining connection on the data transmission of the connections already in the vectored group is minimized or at least reduced by an adaptation of the crosstalk reduction coefficients of the connections already in the vectored group in crosstalk reduction unit 11 of the embodiment of FIG. 1.

Some time, but not necessarily immediately after this first vector training, in the currently discussed embodiment a second vector training is performed to adapt the vectoring to reduce or cancel crosstalk resulting from the influence of the communication connections of the vectored group to the joining communication connection.

In one embodiment, which may be combined with the aforementioned embodiments, but also used separately, the vector training is generally performed using modified nonpayload data carrying signals like pilot symbols or pilot signals as mentioned above. For example, synchronization symbols used in a standardized communication method like VDSL to synchronize super frames may be multiplied with sequences of +1 and −1, the sequences of the different channels being chosen such that they are orthogonal to form pilot symbols. For example, Walsh-Hadamard sequences may be used as the modulation sequence.

As mentioned, for performing the above-mentioned training, training signals are sent via the communication connections, for example predefined sequences of signals. For training in the downstream direction, some or all of communication devices 16-19 compare the received training signals with the (known) actually sent training signals and, in some embodiments, calculate an error value indicating a deviation between the sent training signals and received training signals. This error value is then sent back to communication device 10. Crosstalk reduction unit 11 then adapts the crosstalk reduction, i.e. the vectoring, based on the received error values.

However, besides crosstalk other effects may influence the training signals. For example, during a training e.g. in the downstream direction, impulse noise, which may for example be caused by other electrical devices, may disturb the received signals, among them the received training signals. Such an impulse noise event is indicated with an arrow 20 in FIG. 1. While in FIG. 1 such an impulse noise event is shown acting on communication connection 12 near communication device 16, such impulse noise events may affect any communication connection anywhere in the system shown in FIG. 1.

For the downstream direction, usually impulse noise or other noise sources adjacent to one or more of communication devices 16-19 have the largest influence on the received signals as here the signal has already been attenuated by traveling through the respective communication connection 12-15. Conversely in the upstream direction noise sources adjacent to communication device 10 have a greater influence on the received (training) signals than noise sources located closer to communication devices 16-19.

When a noise event like the one described above occurs when receiving a training signal, the resulting error value, depending on the strength of the noise event, may reflect the noise event rather than the crosstalk occurring between the communication connections 12-15. In such a case, adaptation of the vectoring in crosstalk reduction unit 11 may lead to a deterioration of the crosstalk reduction and thus for example to increased error rates.

For example, when a communication connection joins a vectored group, as mentioned above in some embodiments in a first training phase the crosstalk from the joining communication connection to the communication connections already in the vectored group is reduced, and in a second training phase the crosstalk from the communication connections already in the vectored group to the joining communication connection is reduced. Based on the example of FIG. 1, for example, connection 15 may be the joining communication connection and communication connections 12-14 are communication connections already in the vectored group. In this case, for example during the first vector training phase mentioned above an impulse noise as indicated by arrow 20 may lead to an incorrect or suboptimal reduction of crosstalk from communication connection 15 to communication connection 12 and/or other communication connections in the vectored group, therefore leading to a higher susceptibility to bit errors in the communication connections of the vectored group after the joining.

In order to reduce or alleviate this problem, in some embodiments of the present invention temporary noise events like impulse noise are detected, and are taken into account during the training. In other embodiments, a transmitter of training signals is notified of such temporary noise events. In other embodiments, these possibilities are combined.

More specific embodiments making use of one or both of the above features will be explained below in more detail. First, embodiments for the downstream direction will be explained with reference to FIGS. 2-4.

Figure 2:
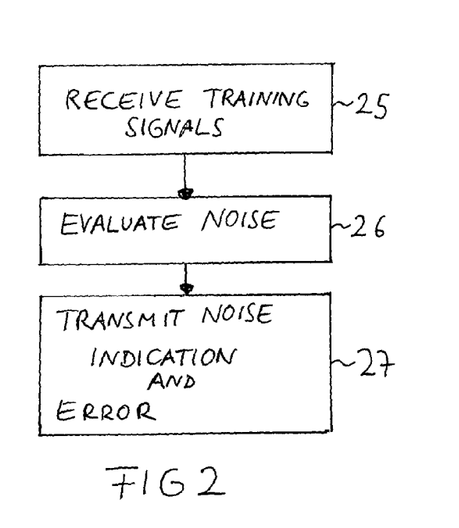
FIG. 2 shows a flow diagram of a method according to an embodiment of the present invention.

In FIG. 2, a flow diagram of a method according to an embodiment is shown. The method of FIG. 2 may for example be implemented in a communication device at a downstream end of a communication connection, for example in one, some or all of communication devices 16-19.

At 25, predefined, i.e. known, training signals for a vector training are received. For example, as explained above the training signals may be synchronization signals or pilot signals modified according to a predefined sequence, for example a Walsh-Hadamard sequence, wherein for example sequences used for different communication connections are orthogonal to each other.

At 26, noise, for example temporary occurring noise like impulse noise, influencing the training signals is evaluated. As the training signals are known training signals, the difference between the actually received training signals and the sent training signals is known at the receiver. In order to determine whether impulse noise or other temporary noise is present, in an embodiment the deviation between the received signal and the sent signal may be compared with an average deviation. As for example impulse noise influences the signal only for a short time, it may for example be determined that impulse noise is present when the deviation between received signal and sent signal exceeds the average deviation by a predetermined amount. In other embodiments, for example embodiments where as explained above synchronization or pilot signals are modified according to a predetermined sequence, between these pilot or synchronization signals data signals may be sent. If, at such a signal immediately before or after the synchronization or pilot signal, a data signal having an amplitude exceeding a predetermined threshold is received, it may be determined that impulse noise or other temporary noise is present. In still another embodiment, additionally or alternatively Trellis encoding and Viterbi decoding may be used. In such system, it may be determined that temporary noise like impulse noise is present if the distance between the shortest and the second shortest path is below a predetermined threshold. However, it is to be noted that the present invention is not limited to the above example for the determination of temporary noise.

At 27, based on the evaluation at 26 a noise indication is transmitted together with an error value, for example back to the entity from which the training signals were received, for example back to communication device 10 in the embodiment of FIG. 1. The noise indication may be a flag which indicates whether temporary noise was detected at 26 or not. In other embodiments, the noise indication may be a multi bit value which may quantify the detected noise, i.e. also gives an information regarding the magnitude of the noise, for example the amount by which the threshold mentioned above was exceeded and/or which may give an indication of the probability that the received signal was influenced by temporary noise. The error signal corresponds to the conventional error signal, i.e. an indication of a deviation between sent and received training signal, for example a slicer error.

Figure 3:
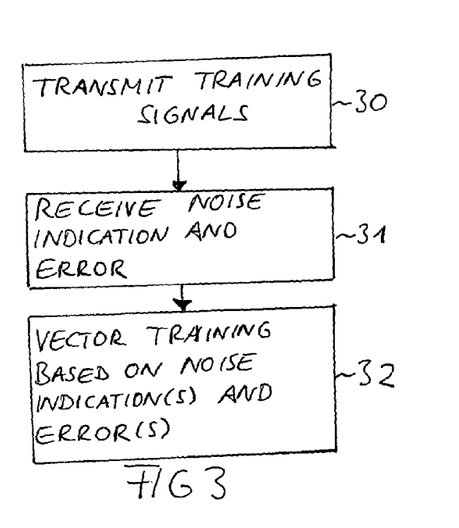
FIG. 3 shows a flow diagram of a method according to an embodiment of the present invention.

In FIG. 3 an embodiment of a method which may for example be implemented at an upstream side of a communication system, for example in communication device 10 of FIG. 1, is shown. The embodiment of FIG. 3 may be used in the same system as the embodiment of FIG. 2 and cooperate with the embodiment of FIG. 2. However, the embodiments of FIGS. 2 and 3 may also be used independently from each other.

At 30, training signals for vector training are transmitted via one or more communication connections. The training signals may be training signals as explained with reference to FIG. 2, i.e. synchronization or pilot signals modulated with sequences like orthogonal Walsh-Hadamard sequences.

At 31, an error and a noise indication are received for example an error and a noise indication for each communication connection over which training signals were transmitted at 30. In some embodiments, when the crosstalk from joining communication connection to communication connections already in the vectored group is to be reduced, error signals and noise indications are received from communication devices coupled to communication connections of the vectored group. Conversely, if the crosstalk from the communication connections in the vectored group to the joining communication connection is to be reduced, an error signal and a noise indication may be received from a communication device coupled to the joining communication connection. In other embodiments, error signals and noise indications may be received from some or all communication connections. Error and noise indication correspond for example to the transmitted noise indication and error of 27 of FIG. 2.

At 32, a vector training is performed based on the noise indication or indications and error or errors received.

In an embodiment, generally the vector training adapts the vectoring to minimize the error signals received, for example by adapting coefficients for calculating the above-mentioned linear combinations of signals. In an embodiment, if a noise indication indicates that temporary noise has affected a specific error signal, this error signal may be disregarded or reduced to reduce the influence of this error signal on the adaptation of the vectoring. In another embodiment, the duration of the vector training may be increased based on the amount of impulse or other temporary noise detected. In still other embodiments, if the amount of temporary noise detected exceeds a predetermined threshold, the vector training may be aborted such that the joining communication connection does not join the vectored group and is at least temporarily disabled for data communication.

The embodiments of FIGS. 2 and 3 may generally be used in vectored communication systems where transmitters and/or receivers for a plurality of communication connections are co-located and signals are processed jointly as explained above. A particular example for a communication system where these methods may be implemented is a DSL communication system like a VDSL communication system. An example for such a system according to an embodiment of the present invention will now be discussed with reference to FIG. 4.

Figure 4:
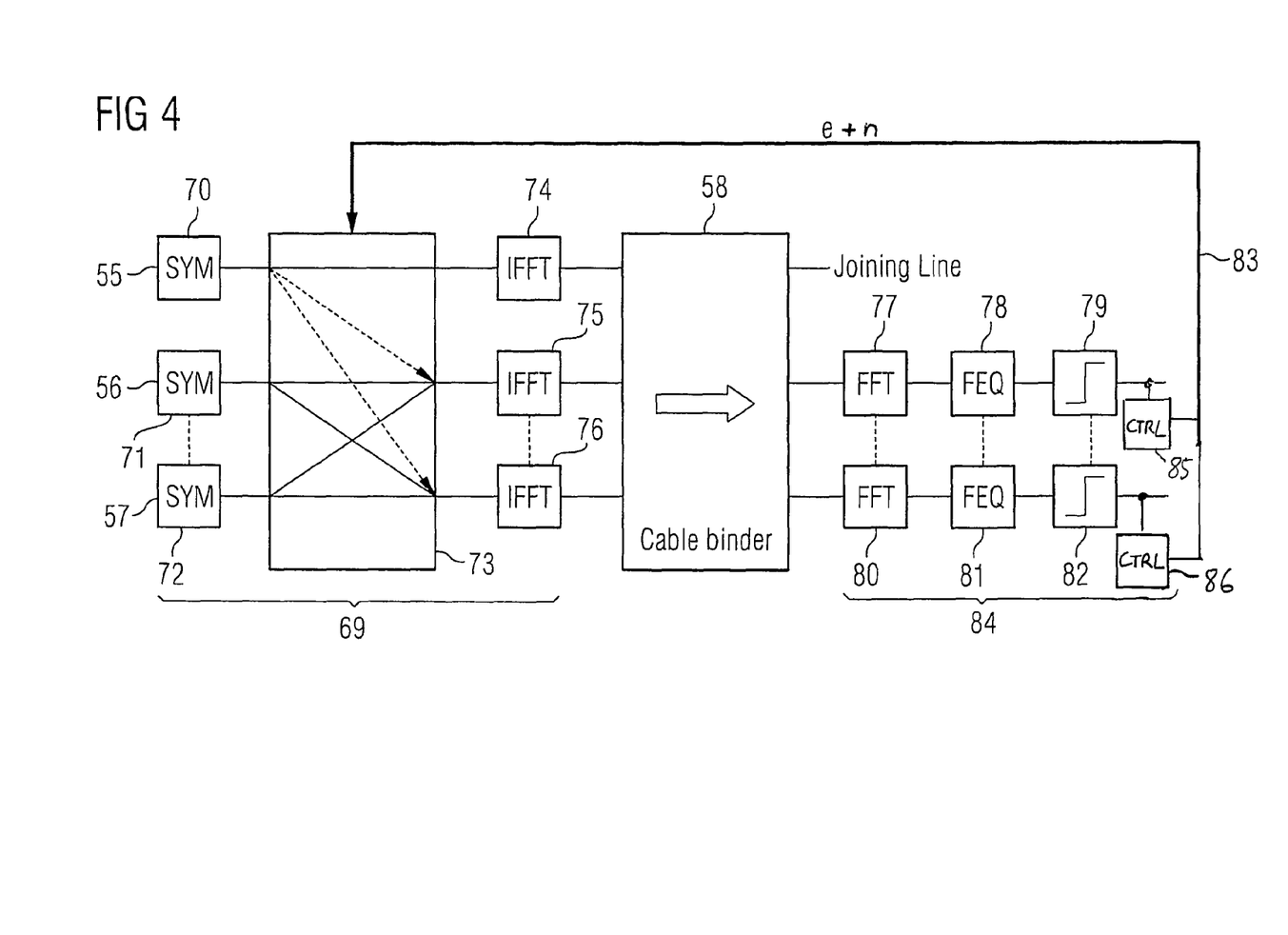
FIG. 4 shows a block diagram of a communication system according to an embodiment of the present invention.

In the system shown in FIG. 4, data is transmitted from a central office 69 via a plurality of communication lines 55, 56, 57 to a plurality of receivers in customer premises generally labeled 84. In the system of FIG. 4, the communication lines are joined in a so-called cable binder 58. Communication lines in a cable binder are usually located comparatively close to each other and are therefore prone to crosstalk. In the system shown in FIG. 4, communication lines 56 and 57 as well as further (not shown) communication line indicated by dotted lines are already incorporated in the vectored group. It should be noted that the number of communication lines in the vectored group is not limited to any particular number. Communication line 55 in the example shown is a joining line, i.e. a communication line to be added to the vectored group.

In the system of FIG. 4, a symbol mapper denoted with reference numerals 70, 71 and 72 maps data, e.g. payload or training data, onto carrier constellations which are to be transmitted via communication lines 55, 56 and 57, respectively. A crosstalk precompensator 73 modifies these symbol mappings in order to precompensate crosstalk occurring during the transmission. The such modified carrier mappings are modulated onto a plurality of carriers for each communication line, said carriers having different frequencies, and are then transferred into signals in the time domain by inverse fast Fourier transformations 74, 75 and 76, respectively. This type of modulation, also referred to as discrete multitone modulation (DMT) is commonly used in DSL systems like VDSL systems or VDSL2 systems. The such generated signals are then transmitted via the communication line to the customer premises. The received signals are then converted into the frequency domain by fast Fourier transformers 77 and 80, respectively and equalized by frequency equalizers 78, 81, respectively before slicers 79 and 82, respectively output received constellations which, in case of an error-free transmission, correspond to input constellations generated in 71, 72 originally intended for transmission. It should be noted that also a customer premises equipment of the joining lines may have elements corresponding to the elements shown for the vectored lines like fast Fourier transformer, frequency equalizer and slicer, but these are not shown in FIG. 4. Moreover, it is to be understood that for clarity's sake only some elements of the communication devices involved are shown, and further devices like amplifiers, sampling units and the like may be present.

In an embodiment, during a first training phase, crosstalk from the joining line 55 to the lines already in the vectored group like lines 56 and 57 is to be reduced, the crosstalk being indicated in FIG. 4 by dashed arrows in crosstalk precompensator 73.

As already mentioned, for adapting the vectoring which is implemented in this case by crosstalk precompensator 73 to the joining line, synchronization symbols transmitted may be modified e.g. by Walsh-Hadamard sequences to form orthogonal pilot sequences. The synchronization symbols on all the lines may be sent in a synchronized manner, i.e. at the same time.

In an embodiment, a specific sequence is reserved for joining lines. For example, using the Walsh-Hadamard sequences multiplying the synchronization symbols with sequences of +1 and −1 described above, a sequence consisting only of +1 values or of alternating +1 and −1 values may be reserved for joining lines.

On the joining line, in the embodiment of FIG. 3, during this training phase quiet symbols or carrier-pilot symbols which only relate to one or a few carriers are transmitted between the synchronization symbols. Therefore, through crosstalk the data transmission occurring in the vectored lines already in the vectored group between the synchronization symbols is not or is not significantly disturbed and can continue during this phase.

Via respective backchannels in the vectored lines, an error signal e is transmitted back to crosstalk precoder 73. Error signal e for the synchronization symbols is indicative of a difference between the synchronization symbols sent (which are known to the receiver since fixed sequences are used) and the symbols actually received. Based on this error signal, the crosstalk precompensator 73 is adapted to reduce the error, i.e. the difference between symbols sent and symbols received, by reducing the effect of crosstalk from the joining line to the vectored line.

The error signal e may for example be determined in control circuitry 85, 86 in the communication devices in the receivers 84. It should be noted that control circuitry 85, 86 need not be separate control circuitry, but may be integrated in any suitable element in the receivers, for example in a digital signal processor, which may also execute the function of other elements in the receiver like Fast Fourier transformers 77, 80, frequency equalizers 78, 81 and/or slicers 79, 82.

In the embodiment of FIG. 4, control circuitry 85, 86 additionally determine a noise indication n which is also sent back to central office 69 via back channel 83. Noise indicator n may be obtained as already explained with respect to 26 in FIG. 2, for example by comparing the difference between sent and received training symbols with a predetermined threshold or with an average value or by comparing the amplitude of signals immediately preceding or following the training symbols with a predetermined threshold.

Noise indicator n may for example be a one bit flag or multi bit value, the latter indicating not only the presence but also the magnitude of noise.

It should be noted that in systems like the above-described DSL system where for each communication connection, e.g. communication line, data is transmitted via a plurality of communication channels, e.g. carriers, the noise indicator may be provided separately for each communication channel, e.g. each carrier, or noise indicators may be provided separately for groups of communication channels, for example frequency bands comprising a plurality of carriers.

As already explained with reference to 32 of FIG. 3, based on the noise indicator n crosstalk precompensator 73 may modify the vector training, for example prolong the vector training, abort the vector training or disregard or limit error values associated with increased noise. In case separate noise indicators are provided for different carriers or groups of carriers as described above, the above measures may be taken individually for the different carriers or groups of carriers. In systems other than DSL systems, measures may be taken individually for different communication channels or groups thereof.

It should be noted that while in FIG. 4 the scenario where crosstalk from the joining line to the lines in the vectored group is cancelled is shown, also for the training phase where crosstalk from the lines in the vectored group to the joining line is cancelled an error signal and a noise indicator, in particular an error signal and a noise indicator generated by the receiver coupled to the joining line, may be used. In other embodiments, the vectoring may be adapted to precompensate the crosstalk between the joining lines and the lines in the vectored group in the downstream direction in a single training phase.

Next, an embodiment of a method which may be used for vector training in the upstream direction will be discussed with reference to FIG. 5. For the upstream training, generally communication devices like communication devices 16-19 in FIG. 1 transmit training signals to a communication device like communication device 10 of FIG. 1. Also for the upstream direction, the vector training may be split in two training phases in an embodiment, a first training phase where crosstalk from the joining communication connection to the communication connections already in the vectored group is reduced, and a second training phase where crosstalk from the communication connections already in the vectored group to the joining communication connection is reduced.

At 40, training signals are received, for example in communication device 10 of FIG. 1, from one or more communication devices at a downstream end of respective communication connections.

At 41, noise indications and errors are determined based on the received training signals. The noise indications and errors may be determined as explained already with respect to FIG. 2.

At 42, a vector training based on the noise indications and errors determined at 41 is performed. The vector training may be performed essentially as explained with respect to 32 of FIG. 3. For example, the vector training may be extended or terminated depending on the noise indications received, or errors associated with high noise may be disregarded or limited to predetermined values, also referred to as clipping.

Figure 5:
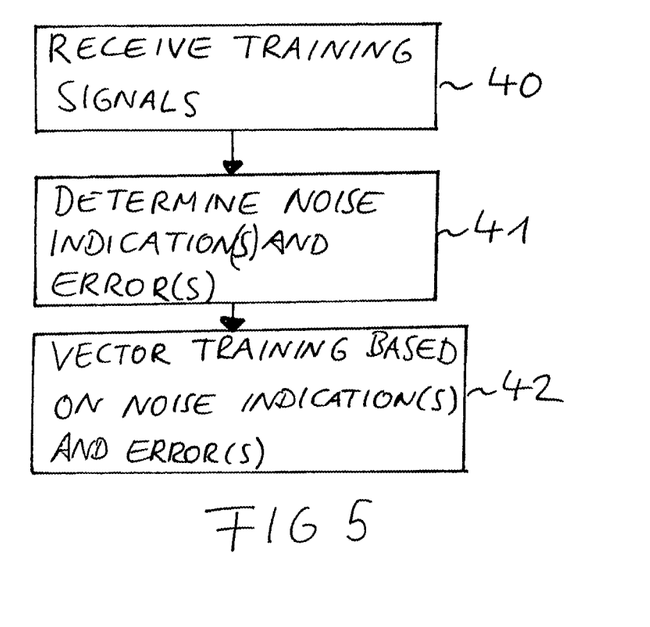
FIG. 5 shows a flow diagram of a method according to an embodiment of the present invention.

As can be seen when comparing the embodiments of FIGS. 2 and 3 with the embodiment of FIG. 5, in the downstream direction the training signals are received at an entity which does not perform the crosstalk reduction, while in the upstream direction in the system of FIG. 1 the training signals are received at the entity which also performs the crosstalk reduction.

It should be noted that for example in a scenario where also communication devices 16-19 of FIG. 1 are co-located, the embodiment of FIG. 5 may possibly be used also in the down-stream direction, and/or the embodiments of FIGS. 2 and 3 may also be used in the upstream direction, as in such a scenario a crosstalk reduction unit may additionally or alternatively also be provided at the location of communication devices 16-19.

Figure 6:
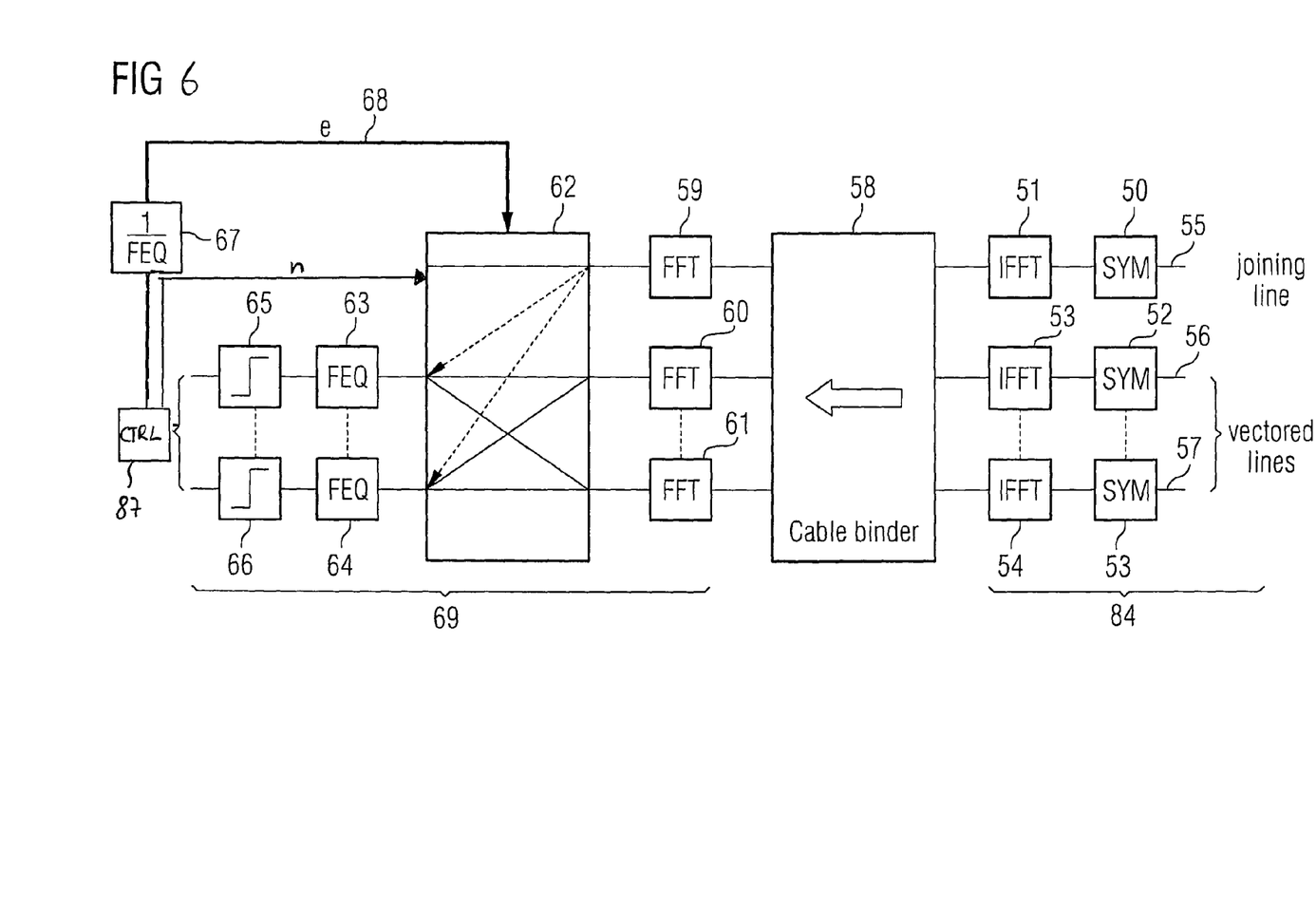
FIG. 6 shows a block diagram of the communication system of FIG. 4 operated in a different transmission direction.

The embodiment of FIG. 5 may generally be used in systems where signals of more than one communication connection is processed at the same location thus enabling a vectoring. A particular system where the embodiment of FIG. 5 may be employed is a DSL communication system like a VDSL communication system. A corresponding DSL communication system according to an embodiment is shown in FIG. 6. The embodiment of FIG. 6 corresponds to the embodiment of FIG. 4, with the difference that now the upstream communication direction is shown in more detail, while FIG. 4 shows the downstream communication direction in more detail.

On the side of customer premises equipment 84, symbols 50, 52 and 53 are transmitted via the lines, symbol 50 being transmitted via the joining line 55 and symbols 52 and 53 being transmitted via the vectored lines 56, 57. Again it should be noted that while only two vectored lines are depicted, they are intended to represent any arbitrary number of vectored lines. The symbols are modulated onto a plurality of carriers for each line corresponding to the already mentioned DMT modulation according to the VDSL2 standard used and transferred into time domain signals by inverse fast Fourier transformers 51, 53 and 54, respectively. The signals are then transmitted in the upstream direction via the respective lines 55, 56 and 57 which are in cable binder 58 to central office 59. Here, the received signals are sampled and transferred to the frequency domain via fast Fourier transformers 59, 60 and 61.

A crosstalk canceller 62 is used to cancel crosstalk occurring between the lines in cable binder 58. It should be noted that crosstalk canceller 62 may fully or partially be implemented using the same circuit elements as crosstalk precompensator 73 of FIG. 4, for example by using a common digital signal processor, but also may be implemented using separate elements. Similar to what has already been described for the receiver part of customer premises equipment 84 with reference to FIG. 4, in the receiver part of central office 59 shown in FIG. 6 frequency equalizers 63, 64 followed by slicers 65, 66 are provided to recover received symbols which in case of error free transmission correspond to symbols 52, 53 originally sent.

At this stage, i.e. in phase 43 of FIG. 3, no recovery of the symbols sent via joining line 55 is performed in the embodiment of FIG. 3, although in other embodiment symbols sent via the joining line may be recovered as well.

Since the synchronization symbols are again, as already explained for the downstream direction, predetermined sequences, an error signal e can be calculated by control circuitry 87 describing the difference between the sent synchronization symbols and the symbols actually received for the synchronization symbols. In the embodiment of FIG. 5, with an element 67 the frequency equalization performed in element 63, 64 is reversed, although this is not mandatory for obtaining error signals. Via one or more feedback lines 68, the error signal is provided to crosstalk canceller 62 which adapts the crosstalk cancellation such that the crosstalk, in particular the crosstalk from the joining line to the vectored lines, is reduced.

Control circuitry 87 additionally determines a noise indication n for some or all of the communication lines involved and forwards the same to crosstalk canceller 62. The determination of noise indication n may be performed essentially in the same manner as already described for the embodiment of FIG. 4. In the embodiment of FIG. 6, crosstalk canceller 62 adapts the crosstalk cancellation based on noise indication n, for example by extending the training period if noise indication n indicates noise like temporary noise, for example impulse noise, on one or more of the communication connections exceeding a predetermined threshold or by cancelling the training in case the noise indication indicates a noise so strong that a successful training and sufficient crosstalk cancellation presumably is not possible.

While in FIG. 6 the training for the cancellation of crosstalk from the joining line 55 to the lines already in the vectored group is shown, a noise indication as described above may also be used in the course in the training for cancelling the crosstalk from the lines already in the vectored group to joining line 55. In this case, additionally or alternatively an error signal and a noise indication from the joining line may be used. In still another embodiment, the crosstalk cancellation between the joining line and the lines already in the vectored group may be adapted in a single training phase.

It should be noted that the above-described embodiments serve only as examples for implementations of some embodiments of the present invention, and the application of the present invention is not restricted to these embodiments. For example, while specific systems using a DSL standard like VDSL has been explained in detail, noise may also affect vector training signals of other systems including wireless systems, and the vector training may be adapted according to the detected noise. Therefore, the present invention is not to be limited to the above-described embodiments, but is intended to be limited only by the appended claims and equivalents thereof.

What is claimed is:

1. An apparatus, comprising:
    a receiver configured to receive vector training signals transmitted via a communication connection; and
    a control circuitry configured to evaluate noise other than crosstalk influencing the vector training signals and to transmit a noise indication via the communication connection based on the noise evaluation and an error signal via the communication connection, the noise indication indicating whether noise other than crosstalk influencing the vector training signals was detected and comprising information regarding a magnitude of such noise, the error signal indicating a deviation between sent and received vector training signals, wherein the control circuitry is configured to evaluate the noise by comparing a deviation of a received synchronization symbol from an expected value with an average deviation between synchronization symbols received and their respective expected values.

2. The apparatus of claim 1, wherein the noise comprises at least one noise type selected from the group consisting of: impulse noise; temporary noise; and radio frequency ingress noise affecting only a selected number of communication channels.

3. The apparatus of claim 1, wherein the vector training signals comprise synchronization symbols.

4. The apparatus of claim 3, wherein the control circuitry is configured to evaluate the noise by evaluating Trellis path metrics.

5. The apparatus of claim 3, wherein the control circuitry is configured to evaluate the noise by evaluating noise of at least one symbol received immediately adjacent a synchronization symbol.

6. The apparatus of claim 1, wherein the noise indication is selected from the group consisting of: a flag indicating whether noise was detected; and a multi-bit signal indicating a magnitude of the noise.

7. The apparatus of claim 1, wherein the control circuitry is configured to transmit the noise indication via a backchannel.

8. The apparatus of claim 1, wherein the receiver is configured to receive signals via a plurality of communication channels, and the control circuitry is configured to transmit a plurality of noise indications for different communication channels.

9. An apparatus, comprising:
    a plurality of transmitters configured to be coupled to communication connections and to transmit vector training signals via the communication connections; and
    a vectoring device configured to reduce the influence of crosstalk between at least some of the communication connections by vectoring, wherein the vectoring device is further configured to adapt the vectoring based on error information and non-crosstalk noise information received in response to the transmitting of the vector training signals,
    wherein the non-crosstalk noise information indicates whether noise other than crosstalk influencing the vector training signals was detected and comprises information regarding a magnitude of such noise, so that the crosstalk reduction implemented by the vectoring device does not deteriorate with the use of the non-crosstalk noise information,
    wherein the error information indicates a deviation between sent and received vector training signals.

10. The apparatus of claim 9, wherein the vectoring device is configured to extend a time period allocated to the adapting of the vectoring if the non-crosstalk noise information indicates non-crosstalk noise exceeding a predetermined threshold.

11. The apparatus of claim 9, wherein the vectoring device is configured to terminate the adapting of the vectoring if the non-crosstalk noise information indicates non-crosstalk noise exceeding a predetermined threshold.

12. The apparatus of claim 9, wherein the vectoring device is configured to disregard an error value associated with noise exceeding a predetermined threshold as indicated by the non-crosstalk noise information.

13. The apparatus of claim 9, wherein the vectoring device is configured to limit an error value associated with noise exceeding a predetermined threshold as indicated by the non-crosstalk noise information.

14. The apparatus of claim 9, wherein the non-crosstalk noise information indicates the presence of at least one noise type selected from the group consisting of: impulse noise; temporary noise; and radio frequency ingress noise.

15. The apparatus of claim 9, wherein the transmitters are configured to transmit DSL signals.

16. The apparatus of claim 9, wherein the transmitters are configured to transmit modulated sequences of synchronization signals as training signals, wherein sequences assigned to different communication connections are orthogonal to each other.

17. A method of reducing crosstalk for vectored communication, comprising:
    receiving vector training signals transmitted via a communication connection; evaluating noise other than crosstalk influencing the vector training signals; and
    transmitting a noise indication via the communication connection based on the noise evaluation and an error signal via the communication connection, the noise indication indicating whether noise other than crosstalk influencing the vector training signals was detected and comprising information regarding a magnitude of such noise, the error signal indicating a deviation between sent and received vector training signals, wherein evaluating the noise comprises comparing a deviation of a received synchronization symbol from an expected value with an average deviation between synchronization symbols received and their respective expected values.

18. The method of claim 17, wherein evaluating the noise comprises evaluating Trellis path metrics.

19. The method of claim 17, wherein evaluating the noise comprises evaluating noise of at least one symbol received immediately adjacent a synchronization symbol.

20. A method of reducing crosstalk for vectored communication, comprising:
   transmitting vector training signals via a plurality of communication connections; reducing the influence of crosstalk between at least some of the communication connections by vectoring; and
   adapting the vectoring based on error information and non-crosstalk noise information received in response to the transmitting of the vector training signals,
   wherein the non-crosstalk noise information indicates whether noise other than crosstalk influencing the vector training signals was detected and comprises information regarding a magnitude of such noise, so that the crosstalk reduction implemented by the vectoring device does not deteriorate with the use of the non-crosstalk noise information,
   wherein the error information indicates a deviation between sent and received vector training signals.

21. The method of claim 20, wherein adapting the vectoring comprises extending a time period allocated to the adapting of the vectoring if the non-crosstalk noise information indicates non-crosstalk noise exceeding a predetermined threshold.

22. The method of claim 20, wherein adapting the vectoring comprises terminating the adapting of the vectoring if the non-crosstalk noise information indicates non-crosstalk noise exceeding a predetermined threshold.

23. The method of claim 20, wherein adapting the vectoring comprises disregarding an error value associated with noise exceeding a predetermined threshold as indicated by the non-crosstalk noise information.

24. The method of claim 20, wherein adapting the vectoring comprises limiting an error value associated with noise exceeding a predetermined threshold as indicated by the non-crosstalk noise information.

* * * * *